United States Patent [19]

Rackman

[11] Patent Number: 5,614,955
[45] Date of Patent: Mar. 25, 1997

[54] COMPRESSED DIGITAL MULTI-CHANNEL VIDEO COMMUNICATIONS SYSTEM HAVING ONE OR MORE AUXILIARY CHANNELS TO ACCOMODATE HIGH BIT RATES

[75] Inventor: Michael I. Rackman, 1710 Glenwood Rd., Brooklyn, N.Y. 11230

[73] Assignee: Michael I. Rackman, Brooklyn, N.Y.

[21] Appl. No.: 336,862

[22] Filed: Nov. 9, 1994

[51] Int. Cl.$^6$ .............................. H04N 7/12; H04N 7/10
[52] U.S. Cl. .............................. 348/487; 348/6; 348/388; 348/389
[58] Field of Search ................................. 348/388, 389, 348/385, 426, 432, 469, 472, 487, 6, 8, 705; 455/3.1, 4.1, 103, 18, 17, 59, 6.1; 370/68, 80, 57, 58.1, 85.6, 85.7, 95.1; 375/260, 261, 263, 264, 265, 267; 340/827, 826; H04N 7/00, 7/015, 7/06, 7/24, 7/10

[56] References Cited

U.S. PATENT DOCUMENTS

| 3,564,144 | 2/1971 | Diggelmann | 370/80 |
|---|---|---|---|
| 3,641,273 | 2/1972 | Herald et al. | 370/80 |
| 3,876,838 | 4/1975 | Boxall | 370/80 |
| 3,891,805 | 1/1990 | Fallin | 370/80 |
| 4,613,903 | 9/1986 | Nadan | 348/389 |
| 4,673,974 | 6/1987 | Ito et al. | 348/388 |
| 4,933,762 | 6/1990 | Guichard et al. | 348/388 |
| 5,148,272 | 9/1992 | Acampora et al. | 348/397 |
| 5,227,876 | 7/1993 | Cuechi et al. | 370/68 |

Primary Examiner—John K. Peng
Assistant Examiner—John W. Miller
Attorney, Agent, or Firm—Gottlieb, Rackman & Reisman

[57] ABSTRACT

A compressed digital multi-channel video communications system having at least one auxiliary channel. The other channels are assigned to respective program sources. These channels are prioritized. The auxiliary channel works with the assigned channel which has the highest priority and which also requires additional bit capacity; the two channels carry bit streams whose combined rate exceeds the highest bit rate that can be carried by a regularly assigned channel. As the needs of the assigned channels continuously change, the auxiliary channel works with different channels.

16 Claims, 1 Drawing Sheet

COMPRESSED DIGITAL MULTI-CHANNEL VIDEO COMMUNICATIONS SYSTEM HAVING ONE OR MORE AUXILIARY CHANNELS TO ACCOMODATE HIGH BIT RATES

BACKGROUND OF THE INVENTION

This invention relates to compressed digital multi-channel video communications system, and more particularly to such a system which is provided with one or more auxiliary channels that allow an increase in the instantaneous effective bit rate for any of the assigned signal-carrying channels.

Considerable work is underway in connection with the development of digital multi-channel video communications systems, such as cable and direct broadcast satellite systems, in which conventional analog video signals are replaced by digital bit streams. Typically, the data transmitted in each channel is compressed, successive video frames being coded according to the MPEG1 or MPEG2 standards. Compression techniques are designed to allow the transmission of sufficient information to represent full motion video in a standard bandwidth channel. (As used herein, the term "channel" is broad and includes not only the channel of a cable or direct broadcast satellite system, but also a channel recording, e.g., on an optical disk.)

Unfortunately, it has been discovered that the digital compression schemes that have been proposed do not always allow the representation of full motion video. This is especially true for fast-changing scenes, for example, a fast-moving football. Even if the encoding bit rate of a channel is variable, there is an instantaneous upper limit and there are necessarily times when the digitally-derived picture is of poorer quality than the conventional analog picture.

It is therefore an object of my invention to provide a communications system for which there is less degradation in fast-changing scenes.

SUMMARY OF THE INVENTION

Briefly, in accordance with the principles of my invention and as implemented in the illustrative embodiment thereof, not all channels are assigned to respective program sources. At least one channel is an auxiliary channel in the sense that at any given instant it can assist one of the other channels to carry some of the bit information required for that channel's respective program material. The assigned channels (NBC, CBS, HBO, etc.) are given priorities. Of all the channels which at any instant require additional bit capacity to correct signal degradation, the channel with the highest priority is given the use of the auxiliary channel so that some of its bit information can be sent over the auxiliary channel. As the needs of the assigned channels change, at any given instant a new "highest priority" channel may require use of the auxiliary channel, in which case the auxiliary channel is reassigned to it.

Although in the illustrative embodiment of the invention there is only one auxiliary channel, it is to be understood that several such auxiliary channels may be employed. For example, in a 150-channel system, 145 channels may be assigned to carry respective program materials. The remaining five channels would be assigned to the five highest priority channels which at any particular time require additional capacity. (It is also possible to allow one or more of the 145 channels to share an auxiliary channel so that any one of the auxiliary channels can add capacity to two or more of the assigned channels, but this added complexity is not provided for in the illustrative embodiment of the invention.)

Further objects, features and advantages of the invention will become apparent upon consideration of the following detailed description in conjunction with the drawing which depicts the illustrative embodiment of the invention.

BRIEF DESCRIPTION OF THE DRAWING

For a fuller understanding of the invention, reference is made to the following description taken in connection with the accompanying drawing, in which.

DETAILED DESCRIPTION OF THE DRAWING

Figure 1:
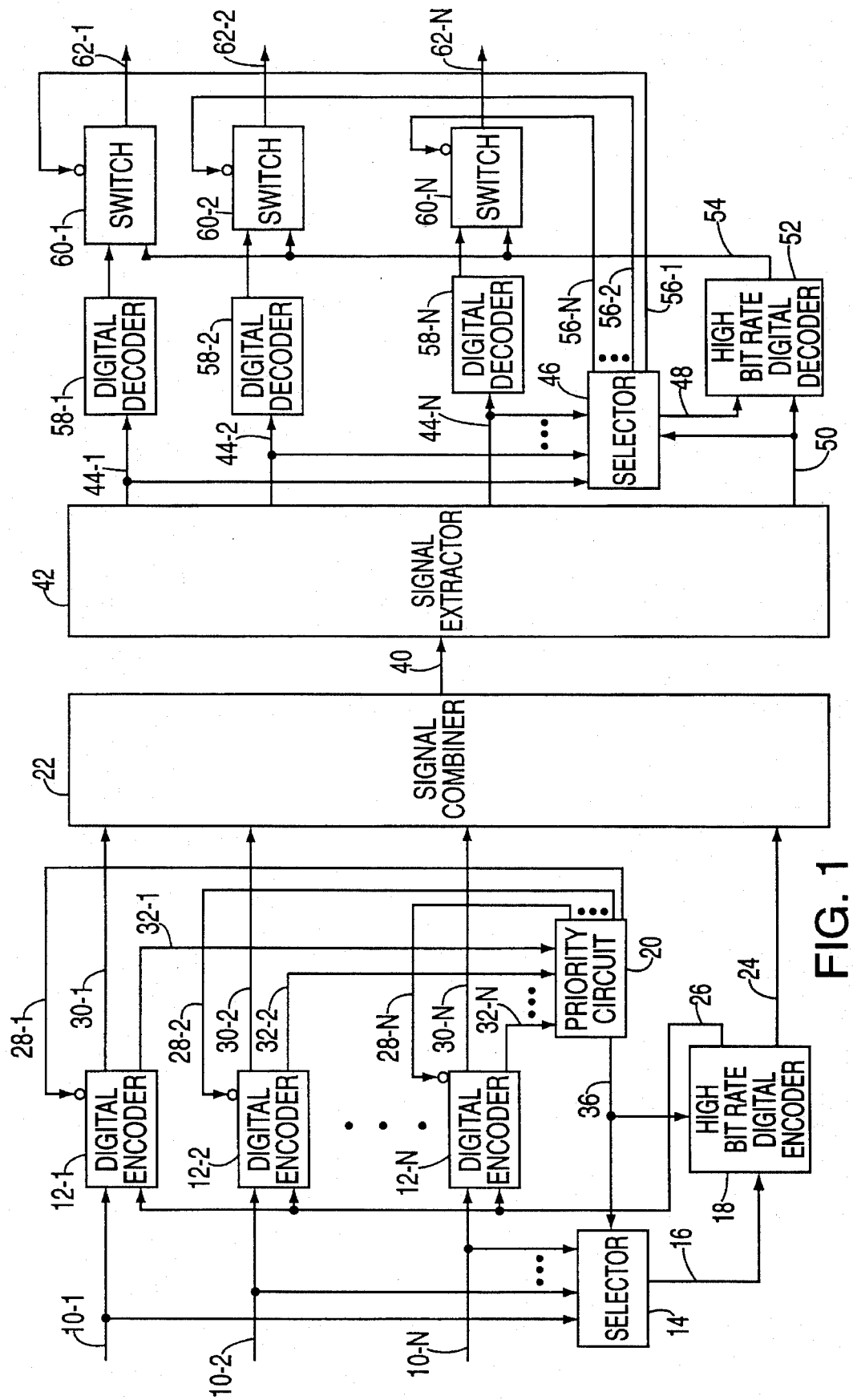
FIG. 1 is a block diagram of the invention.

The left side of the drawing shows the equipment necessary to practice my invention at the head end of a cable system. Channels 10-1 through 10-N carry respective analog program materials to be broadcast. Each of these assigned channels is applied to an input of a respective digital encoder 12-1 through 12-N. In a conventional system, the N outputs of the digital encoders, bit streams on respective conductors 30-1 through 30-N, are extended to signal combiner 22 which combines the bit streams for transmission purposes, such transmission being shown symbolically by arrow 40.

Each of the digital encoders has an output connected by a respective one of conductors 32-1 through 32-N to priority circuit 20. Each encoder energizes its respective output conductor if the maximum bit rate of the encoder is insufficient to adequately represent the analog signal that is being digitized. At any given moment there may be no digital encoders which require "help." Often, there will be only one which requires an increase in bit capacity. But in the event that there are several, priority circuit 20 determines which of those encoders requiring additional bit capacity is of the highest priority. The N channels are prioritized in circuit 20 at the option of the cable operator. For example, the national networks may be given priority over local channel programming.

Priority circuit 20 extends a control signal over line 36 to both selector 14 and high bit rate digital encoder 18 to enable their operations. Each of the N channels is applied to a respective input of selector 14, and the control signal from priority circuit 20 causes selector 14 to extend only the identified one of the input channels to high bit rate digital encoder 18. Thus the highest priority channel which requires additional bit capacity has its analog signal extended to encoder 18. Encoder 18 operates in a manner similar to that of encoders 12-1 through 12-N, but encoder 18 generates bits at a much higher rate so that fast-moving scenes can be represented. The high bit rate at the output of encoder 18 is split into two channels. Half of the bits are applied to auxiliary channel 24 which is extended to signal combiner 22 so that the bits on this channel can be combined with those on the other N channels. The other half of the bits at the output of encoder 18, on conductor 26, are extended to an input of each of digital encoders 12-1 through 12-N. Each of the digital encoders normally operates on the analog signal at its upper input, the input to which is connected a respective one of conductors 10-1 through 10-N. However, when the control terminal on the digital encoder connected to one of conductors 28-1 through 28-N is energized, the digital encoder does not encode the analog signal at its upper input. Instead, it simply passes the bit stream on conductor 26 to the respective output 30-1 through 30-N. Priority circuit 20 energizes only one of conductors 28-1 through 28-N, the conductor that is energized being the one associated with the highest priority channel that requires additional bit capacity. Thus, for example, if channel 10-2 requires a bit rate which normally cannot be generated by digital encoder 12-2, the analog signal on conductor 10-2 is extended through selector 14 to high bit rate digital encoder 18. The resulting bit sequence is split, with half the bits being extended to signal combiner 22 on conductor 24, and the other half of the bits being extended to the signal combiner over conductor 26 and through digital encoder 12-2 to conductor 30-2.

High bit rate digital encoder 18 inserts a unique digital code in the bit stream on channel 24 which identifies to which of the N channels the auxiliary channel has been assigned. The code is inserted when channel 24 is first newly paired with one of the assigned channels, to tell the receiving equipment (to be described below) of the new pairing. Another unique digital code is inserted when high bit rate encoding is no longer needed to so inform the receiving equipment.

Although control line 36 is shown extended to encoder 18 (to turn it on) and to selector 14 (to control selection of one of its inputs), conductors 28-1 through 28-N can be extended to the selector instead of line 36. This would allow the energized one of conductors 28-1 through 28-N to not only change the operating mode of the selected one of encoders 12-1 through 12-N, but also to directly control which analog signal is extended to the high bit rate digital encoder 18 through selector 14.

The net result is that the highest priority assigned channel that requires "help" is in effect given an additional digital channel. And whenever a higher priority channel requires additional bit capacity, it immediately assumes control with high bit rate digital encoder 18 operating on its respective signal.

The right side of the drawing depicts circuitry for generating N analog signals from an incoming bit stream. The system includes N digital decoders 58-1 through 58-N and a high bit rate digital decoder 52. Such extensive equipment is required if all N video signals are to be derived. In the case of a simple receiver which requires only one video signal, only a single high bit rate digital decoder would suffice, the decoder operating on either a single bit stream on one of conductors 44-1 through 44-N, or on one of these bit streams and also the bit stream on the auxiliary conductor 50. Simplified receiving equipment of this type will be apparent to those skilled in the art after the "full blown" system on the right side of the drawing is first understood.

The incoming bit stream enters signal extractor 42 and is separated out into N+1 bit streams, on conductors 44-1 through 44-N and on conductor 50. These N+1 bit streams correspond to the bit streams on channels 30-1 through 30-N and channel 24 at the transmitting end of the system. The N bit streams on the assigned channels are extended to respective inputs of channel selector 46.

The bit stream on conductor 50 includes a code identifying the channel to which the auxiliary channel has been assigned, and the bit stream on conductor 50 is connected to a control input of selector 46. The channel selector, once it is informed of the channel with which the auxiliary channel is working, extends the respective conductor 44-1 through 44-N to conductor 48. The bits in the selected channel are extended to high bit rate digital decoder 52 along with the bits in the auxiliary channel. The output of decoder 52, on conductor 54, is an analog signal which is reconstructed from the two bit streams. This signal is applied to one input of each of switches 60-1 through 60-N.

Each of digital decoders 58-1 through 58-N operates on its respective bit stream and applies an analog signal to an input of the respective switch 60-1 through 60-N. Channel selector 46 energizes one of conductors 56-1 through 56-N, the conductor which is energized being the conductor associated with the channel to which the auxiliary channel has been assigned. Each of switches 60-1 through 60-N extends the analog signal from its respective digital decoder 58-1 through 58-N to its output 62-1 through 62-N in the absence of the energization of its control input via a respective one of conductors 56-1 through 56-N. Only the channel which is given the extra capacity has its respective control line energized so that its respective switch extends the analog signal on conductor 54 to the respective output 62-1 through 62-N.

The embodiment of FIG. 1 discloses only a single high bit rate digital encoder with a single auxiliary channel 24. Likewise, at the decoding end only a single high bit rate digital decoder 52 having a single conductor 54 is disclosed. This is for simplicity purposes. In the preferred embodiment, N would equal approximately 100 or more lines, and plural auxiliary lines would also be included. For example, there may be five auxiliary lines, and accordingly, five high bit rate digital encoders and decoders would be required.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A digital multi-channel video communications system having a plurality of digital channels each assigned to a respective video program source and for carrying a digital bit sequence which represents such respective video program source, at least one auxiliary digital channel variably assigned to a video program source and for carrying a digital bit sequence, means for prioritizing said assigned digital channels, means for determining when the program source associated with any of the assigned channels requires a digital bit rate which exceeds the capacity of the respective assigned channel, and means for pairing the at least one auxiliary channel with the highest priority assigned channel requiring additional bit rate capacity so that the digital bit sequence for the respective program source is carried in part by the assigned channel and in part by the at least one auxiliary channel.

2. A digital multi-channel video communications system in accordance with claim 1, further including means for combining and transmitting bit sequences on all channels together with a code indicating which of the assigned channels is paired with said at least one auxiliary channel.

3. A digital multi-channel video communications system in accordance with claim 2, further including a receiver having means for separating said combined bit sequences into individual channel digital bit sequences.

4. A digital multi-channel video communications system in accordance with claim 3, further including a receiver having means for deriving an analog signal from the bit sequence on any of said assigned channels, and means for deriving an analog signal from the combined bit sequences on any of said assigned channels and said at least one auxiliary channel in accordance with said code.

5. A digital multi-channel video communications system in accordance with claim 3, further including means for combining the digital bit sequence for the respective program source that is carried in part by the assigned channel and in part by the at least one auxiliary channel, and deriving an analog signal therefrom.

6. A digital multi-channel video communications system in accordance with claim 5, further including means for passing said derived analog signal to only the channel associated with the respective program source.

7. A digital multi-channel video communications system having a plurality of digital channels each assigned to a respective video program source and for carrying a digital bit sequence which represents such respective video program source; at least one auxiliary digital channel variably assigned to a video program source and for carrying a digital bit sequence; means for determining when the program source associated with any of the assigned channels requires a digital bit rate which exceeds the capacity of the respective assigned channel; and means for pairing the at least one auxiliary channel with the assigned channel requiring additional bit rate capacity, so that the auxiliary channel provides additional bit rate capacity for the respective video program source.

8. A method of communicating multiple channels of video information over a communication line including multiple assigned channels and at least one auxiliary channel, comprising the steps of:

receiving multiple channels of video information from respective video information sources;

assigning a separate channel to the video information from each video information source;

digitizing the video information from each video information source;

determining when the digital bit rate required by each said channel of digitized video information exceeds the capacity of the assigned channel; and pairing an auxiliary channel with an assigned channel which requires additional bit rate capacity.

9. The method in accordance with claim 8 further including the step of prioritizing the assigned channels.

10. The method in accordance with claim 9 wherein the auxiliary channel is paired with the channel requiring additional bit rate capacity that has the highest priority.

11. The method in accordance with claim 8 further including the step of combining into one signal said digital bit sequences of said multiple assigned and auxiliary channels.

12. The method in accordance with claim 11 wherein said combined signal allows distinguishing between the different channels of digital bit sequences.

13. The method in accordance with claim 12 further including the step of separating said combined signal into multiple digital bit sequences.

14. The method in accordance with claim 13 further including the step of determining which of said multiple digital bit sequences is carried in part by said at least one auxiliary channel.

15. The method in accordance with claim 14 further including the step of deriving an analog video signal representative of the digital bit sequence carried on the at least one auxiliary channel and the assigned channel associated with the at least one auxiliary channel.

16. The method in accordance with claim 15 further including the step of passing the derived analog video signal to the channel associated with the video information source.

* * * * *